United States Patent [19]

Groff

[11] 4,396,675
[45] Aug. 2, 1983

[54] STORABLE, CROSSLINKABLE PRESSURE-SENSITIVE ADHESIVE TAPE

[75] Inventor: Gaylord L. Groff, St. Paul, Minn.

[73] Assignee: Minnesota Mining and Manufacturing Company, St. Paul, Minn.

[21] Appl. No.: 421,150

[22] Filed: Sep. 22, 1982

[51] Int. Cl.³ .................................................. C09J 7/02
[52] U.S. Cl. .................................... 428/346; 428/355; 525/163
[58] Field of Search ................ 428/355, 346; 525/163, 525/343

[56] References Cited

U.S. PATENT DOCUMENTS

| | | | |
|---|---|---|---|
| Re. 24,906 | 12/1960 | Ulrich | 206/59 |
| 2,925,174 | 2/1960 | Stow | 428/355 |
| 2,973,286 | 2/1961 | Ulrich | 428/355 |
| 3,183,282 | 5/1965 | Hurwitz | 525/163 |
| 3,284,423 | 11/1966 | Knapp | 260/80.5 |
| 3,475,213 | 10/1969 | Stow | 117/227 |
| 3,548,027 | 12/1970 | Hornung et al. | 525/163 |
| 3,740,366 | 6/1973 | Sanderson et al. | 260/29.6 |
| 4,181,752 | 1/1980 | Martens et al. | 427/54.1 |
| 4,286,047 | 8/1981 | Bennett et al. | 430/280 |

Primary Examiner—George F. Lesmes
Assistant Examiner—Beverly Johnson
Attorney, Agent, or Firm—Cruzan Alexander; Donald M. Sell; Richard E. Brink

[57] ABSTRACT

Pressure-sensitive adhesive tape, the adhesive layer of which is a copolymer of alkyl acrylate such as isooctyl acrylate and acid such as acrylic acid which differs from the prior art by including a small amount of lower-alkoxylated amino formaldehyde condensate as a latent crosslinking agent. The adhesive does not become crosslinked until it is heated. After the tape has been applied and heated to crosslink the adhesive, it exhibits excellent resistance to common organic solvents and also exceptional resistance to shear failure, especially at elevated temperatures. The adhesive has excellent electrical-insulating properties.

9 Claims, No Drawings

STORABLE, CROSSLINKABLE PRESSURE-SENSITIVE ADHESIVE TAPE

TECHNICAL FIELD

This invention relates to pressure-sensitive adhesive tape, the adhesive layer of which is a copolymer of alkyl acrylate and copolymerizable acid, which copolymer can be crosslinked through its acid groups.

BACKGROUND ART

U.S. Pat. No. Re. 24,906 (Ulrich) concerns a pressure-sensitive adhesive tape, the adhesive of which consists essentially of a copolymer of 88–97 parts of alkyl acrylate and correspondingly 12–3 parts of copolymerizable monomer such as acrylic acid. That acrylate copolymer provides excellent adhesion and holding power and experiences no observable deterioration even after years of storage. Although there should be at least four carbon atoms in the alkyl group, or an average of at least four carbon atoms in the alkyl groups, of the alkyl acrylate to provide adequate tackiness at room temperatures, it is recognized that shorter alkyl groups result in acrylate copolymers which become tacky and pressure-sensitive when heated and thus afford the convenience of a pressure-sensitive adhesive tape. Accordingly, the term "pressure-sensitive adhesive" as used here applies to adhesives which may be tack-free at room temperatures but become tacky at elevated temperatures.

To improve certain properties, the acrylate copolymer adhesive as been crosslinked. U.S. Pat. No. 2,973,286 (Ulrich) teaches that solvent resistance is improved by crosslinking by adding an organic peroxide prior to coating and applying somewhat greater heat than would be necessary merely to dry the coating. U.S. Pat. No. 2,925,174 (Stow) teaches crosslinking the acrylate copolymer by reaction with a polyfunctional compound such as a polyamine, a polyol or a polyepoxide. Because crosslinking substantially reduces tackiness, care should be taken to minimize crosslinking until after the tape has been applied to its intended use, and then heating completes the crosslinking.

Known crosslinking agents for acrylate pressure-sensitive adhesives such as those of the aforementioned U.S. Pat. Nos. 2,973,286 and 2,925,174 produce gradual cross-linking during storage at ordinary room temperatures so that unless the crosslinking agent is present in a very small amount, the tape many become useless after a few months. Coatable solutions of the acrylate pressure-sensitive adhesives containing those crosslinking agents usually experience gradually increased viscosity when stored at ordinary room temperatures, so that it has been customary not to add the crosslinking agent to the coating solution until immediately prior to the coating operation.

DISCLOSURE OF INVENTION

The present invention concerns an acrylate pressure-sensitive adhesive tape, the adhesive layer of which is uncrosslinked and contains a crosslinking agent which is latent. That is, the adhesive retains its original tackiness during prolonged storage at ordinary room temperatures and yet becomes crosslinked when heated for a short period at a moderately elevated temperature, e.g., 30 minutes at 120° C. If originally tack-free, the capability of the adhesive to become tacky when heated does not change during storage at room temperature, but because crosslinking begins during such heating, tape should be applied to its intended use as soon as it becomes tacky. Solutions or aqueous dispersions of the adhesive containing the crosslinking agent can be stored for many months without any observable change in viscosity.

The tape of the present invention comprises a backing and a pressure-sensitive adhesive layer comprising an acrylate copolymer as described in the aforementioned U.S. Pat. No. Re. 24,906, namely a copolymer of (a) more than 90 parts of acrylic acid ester of nontertiary alcohol, the molecules of which have from 1–14 carbon atoms, the average being at most 12 carbon atoms and preferably at least 4 carbon atoms so that the copolymer is tacky at ordinary room temperatures, and (b) from one to less than 10 parts by weight of at least one copolymerizable monoethylenic monomer selected from the group consisting of acrylic acid, methacrylic acid, and itaconic acid.

Unlike the acrylate copolymer of that patent, the adhesive layer includes as a crosslinking agent a lower-alkoxylated amino formaldehyde condensate having $C_{1-4}$ alkyl groups, for example, hexamethoxymethyl melamine (available as "Cymel" 303 from American Cyanamide Co.) or tetramethoxymethyl urea (available as "Beetle" 65 from American Cyanamide Co.) or tetrabutoxymethyl urea ("Beetle" 85). The adhesive of the novel tape is substantially uncrosslinked until being heated moderately such as at 120° C. for 30 minutes. Hence, the alkoxylated crosslinking agent is latent. It is effective in amounts within the range of about 0.1 to 10 percent by weight of the copolymer, preferably 1 to 5 percent. Amounts above 10 percent would not enhance crosslinking and might detract from the adhesive properties of the tape.

Upon being crosslinked after being applied, the adhesive of the novel tape exhibits excellent resistance to common organic solvents and also exceptional resistance to shear failure, especially at elevated temperatures. Because the adhesive also has good electrical-insulating properties, the novel tape is particularly useful as an electrical-insulating tape. For such uses, it may be preferred to keep the acid content of the acrylate polymer to no more than about 8 percent by weight because of a possibly corrosive effect of the acid groups.

Preferred backings for electrical-insulating uses of the novel tape are plastic films such as polyimide film and biaxially-oriented polyethylene terephthalate film, nonwoven webs of polyethylene terephthalate fibers, and glass cloth. The invention is also particularly useful for tapes having electrically-conductive backings such as metal foils, and the adhesive layers of such tapes may contain electrically-conductive particles as taught in U.S. Pat. No. 3,475,213 (Stow).

If the backing of the novel tape has a low-adhesion surface, the novel tape may be used as a transfer tape. When so used, both surfaces of the backing may have low-adhesion coatings, one of which is more effective than the other. When unwound, the adhesive layer remains wholly adhered to the higher-adhesion surface, from which it can be subsequently removed.

The novel tape may be made by a procedure as taught in U.S. Pat. No. 4,181,752 (Martens et al). To do so, a mixture of the aforementioned monomers (a) and (b) and a photoinitiator is partially polymerized by ultraviolet radiation to provide a syrup having a coatable viscosity, e.g., 300 to 20,000 centipoises. After adding the aforementioned alkoxylated condensate, this is coated onto a backing, and the coating is exposed to ultraviolet radiation in an inert environment to complete the copolymerization, thus providing a substantially uncrosslinked pressure-sensitive adhesive tape which can immediately be wound upon itself into roll form for storage or shipment. Crosslinking is easily avoided since very little heating is associated with this procedure.

When the novel tape is instead made by coating a solution or dispersion of acrylate copolymer and the alkoxylated condensate onto a backing, the heating to drive off volatiles should be controlled to avoid appreciable reaction between the copolymer and the alkoxylated condensate. Hence, highly volatile vehicles are preferred.

In the following examples, unless otherwise noted, all parts are by weight.

EXAMPLE 1

Onto a biaxially-oriented polyethylene terephthalate film backing having a thickness of 0.033 mm was knife-coated a solution of a copolymer of 98 parts of isooctyl acrylate (IOA) and 2 parts of acrylic acid (AA). The inherent viscosity of the copolymer was about 1.4. Isooctyl acrylate is obtained by esterifying acrylic acid with isooctyl alcohol, a mixture of various isomers of octyl alcohol which is readily available commercially at relatively low prices. The solution consisted of 100 parts of the copolymer, 2 parts of hexamethoxymethyl melamine ("Cymel" 303), 150 parts of ethyl acetate, and 150 parts of heptane. After 3 minutes at 43° C. followed by 3 minutes at 93° C., the dried adhesive thickness was about 0.05 mm. The adhesive layer of the resultant pressure-sensitive adhesive tape was substantially uncrosslinked. Its resistance to 180° peel from steel (ASTM D-1000) was 38 N/dm. After the tape had been stored for nine months at ordinary room temperature, the 180° peel from steel was retested and was 38 N/dm. This indicates that substantially no crosslinking had occurred during storage.

EXAMPLES 2-4

Pressure-sensitive adhesive tapes were made in the same manner as in Example 1 except as indicated in the following table:

| | Parts | | | Backing | Adhesive |
| | | | "Cymel" | Thickness | Thickness |
| Example | IOA | AA | 303 | (mm) | (mm) |
|---|---|---|---|---|---|
| 1 | 98 | 2 | 2 | 0.033 | 0.05 |
| 2 | 94 | 6 | 2 | 0.033 | 0.05 |
| 3 | 98 | 2 | 5 | 0.025 | 0.04 |
| 4 | 94 | 6 | 10 | 0.025 | 0.04 |

180° C. Peel from Steel (ASTM D-1000)

180° peel from steel at 23° C. was tested on freshly prepared tapes without heating and after heating in contact with the steel test panel. Results in N/dm were:

| | Examples | | | |
| | 1 | 2 | 3 | 4 |
|---|---|---|---|---|
| Unheated | 38 | 60 | 29.5 | 41.5 |
| After 30 min. at 120° C. | — | — | 46 | 45 |
| After 60 min. at 120° C. | — | — | — | 39.5 |
| After 15 min. at 150° C. | — | — | 39.5 | 30.5 |

-continued

| | Examples | | | |
| | 1 | 2 | 3 | 4 |
|---|---|---|---|---|
| After 30 min. at 150° C. | 10 | 17.5 | — | — |

STATIC SHEAR VALUE

A 0.5-inch (1.27-cm) strip of tape is adhered by its adhesive layer to a stainless steel plate with four passes of a 4.5-lb (2-kg) hard rubber roller and with a free end of the tape extending beyond the plate and the adhesive contact area being ½ inch by 178 inch (1.27 cm by 1.27 cm). The plate is placed in an oven and positioned 2° from the vertical to prevent peeling. Tests are run by hanging a weight from the free end of the tape, either immediately (unheated) or after being heated a period of time in contact with the test plate to crosslink the adhesive. Failure is indicated when the weight falls. The test is discontinued if there is no failure after 1,400 minutes.

The following table reports Static Shear Values measured at the indicated temperatures using a 500-gram weight. Results are reported in minutes.

| | Examples | | | |
| | 1 | 2 | 3 | 4 |
|---|---|---|---|---|
| At 150° C. | | | | |
| not preheated | 0 | 1 | — | — |
| after 15 min. at 150° C. | 4 | >1400 | — | — |
| At 120° C. | | | | |
| not preheated | 0 | 0.5 | — | — |
| after 30 min. at 120° C. | >1400 | >1400 | — | — |
| At 65° C. | | | | |
| not preheated | — | — | 100 | >1400 |
| after 30 min. at 120° C. | — | — | >1400 | >1400 |
| after 15 min. at 150° C. | — | — | >1400 | >1400 |

SOLVENT RESISTANCE

To test their solvent resistance, strips of the tapes of Examples 1 and 2 were immersed in toluene for 60 minutes and then examined, and additional strips were heated for 30 minutes at 120° C. and likewise immersed in toluene for 60 minutes. Results were

| Example 1 | |
|---|---|
| Unheated | Dissolved |
| After 30 min. at 120° C. | Very firm gel |
| Example 2 | |
| Unheated | Very soft mass |
| After 30 min. at 120° C. | Very firm gel |

THUMB APPEAL

The thumb appeal of the tapes of Examples 1 and 2 was evaluated and after being heated for 30 minutes at 150° C. was re-evaluated at room temperature. Results were

| Example 1 | |
|---|---|
| Unheated | Very aggressively tacky |
| After 30 min. at 150° C. | Just slightly tacky |

-continued

| Example 2 | |
|---|---|
| Unheated | Aggressively tacky |
| After 30 min. at 150° C. | Very low tack |

I claim:

1. A tape comprising a backing and a pressure-sensitive ahdesive layer comprising a copolymer of
   (a) more than 90 parts of acrylic acid ester of nontertiary alcohol, the molecules of which have from 1–14 carbon atoms, the average being at most 12 carbon atoms, and
   (b) at least one copolymerizable monoethylenic monomer selected from the group consisting of acrylic acid, methacrylic acid and itaconic acid,
   wherein the improvement comprises:
   the adhesive layer includes in an amount within the range of about 0.1 to 10 percent by weight of the copolymer, a lower-alkoxylated amino formaldehyde condensate having $C_{1-4}$ alkyl groups, said copolymer being substantially uncrosslinked until being heated.

2. A tape as defined in claim 1 wherein the formaldehyde condensate is hexamethoxymethyl melamine.

3. A tape as defined in claim 1 wherein the backing has a low-adhesion surface from which the adhesive layer can be easily peeled off.

4. A tape as defined in claim 3 wherein the backing has low-adhesion surfaces on both faces, and the tape is wound upon itself in roll form.

5. A tape as defined in claim 4 wherein the pressure-sensitive adhesive layer has been coated from a solution or aqueous dispersion of the acrylate polymer and the coating heated to drive off volatiles, the heating having been controlled to avoid appreciable reaction between the copolymer and the alkoxylated condensate.

6. A tape as defined in claim 1 wherein the alcohol molecules have an average of at least 4 carbon atoms so that the copolymer is tacky at ordinary room temperatures.

7. A tape as defined in claim 1 wherein the backing is a plastic film.

8. A tape as defined in claim 1 wherein the backing is electrically-conductive.

9. A tape as defined in claim 8 wherein the adhesive layer contains electrically-conductive particles.

* * * * *

Dedication 4,396,675.—*Gaylord L. Groff,* St. Paul, Minn. STORABLE, CROSSLINKABLE PRESSURE-SENSITIVE ADHESIVE TAPE. Patent dated Aug. 2, 1983. Dedication filed Dec. 23, 1985, by the assignee, *Minnesota Mining and Manufacturing Co.*

Hereby dedicates to the public the entire remaining term of said patent.
[*Official Gazette February 25, 1986.*]

REEXAMINATION CERTIFICATE (597th)

United States Patent [19]

Groff

[11] B1 4,396,675

[45] Certificate Issued  Nov. 25, 1986

[54] STORABLE CROSSLINKABLE PRESSURE-SENSITIVE ADHESIVE TAPE

[75] Inventor: Gaylord L. Groff, St. Paul, Minn.

[73] Assignee: Minnesota Mining and Manufacturing Company, St. Paul, Minn.

Reexamination Request:
No. 90/000,958, Feb. 14, 1986

Reexamination Certificate for:
Patent No.: 4,396,675
Issued: Aug. 2, 1983
Appl. No.: 421,150
Filed: Sep. 22, 1982

Disclaimer of claims 1-9 Filed: Dec. 23, 1985 (1063 O.G. 44)

[51] Int. Cl.⁴ ............................................. C09J 7/02
[52] U.S. Cl. .................................. 428/355; 428/346; 525/163; 525/343
[58] Field of Search ................ 428/355, 346; 525/163, 525/343

[56] References Cited

U.S. PATENT DOCUMENTS

Re. 24,906  12/1960  Ulrich ................................ 206/59

OTHER PUBLICATIONS

Product Bulletin "CYMEL® 303 Cross-Linking Agent," published 5/79 by American Cyanamid Company.
Product Bulletin "UCAR® Latex 173," published 1981 by Union Carbide Corporation.
Product Bulletin "RESINEWS-CYMEL® 303 Resin as a Cross-Linking Agent for Emulsions," published 5/77 by American Cyanamid Co.

*Primary Examiner*—E. Rollins Buffalow

[57] ABSTRACT

Pressure-sensitive adhesive tape, the adhesive layer of which is a copolymer of alkyl acrylate such as isooctyl acrylate and acid such as acrylic acid which differs from the prior art by including a small amount of lower-alkoxylated amino formaldehyde condensate as a latent crosslinking agent. The adhesive does not become crosslinked until it is heated. After the tape has been applied and heated to crosslink the adhesive, it exhibits excellent resistance to common organic solvents and also exceptional resistance to shear failure, especially at elevated temperatures. The adhesive has excellent electrical-insulating properties.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–9 are now disclaimed.